(12) United States Patent
Patel

(10) Patent No.: US 12,235,854 B2
(45) Date of Patent: Feb. 25, 2025

(54) METHODS AND SYSTEMS FOR GENERATING CLUSTER-BASED SEARCH RESULTS

(71) Applicant: Adeia Guides Inc., San Jose, CA (US)

(72) Inventor: Milan Patel, Santa Clara, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/363,813

(22) Filed: Jun. 30, 2021

(65) Prior Publication Data

US 2021/0326349 A1    Oct. 21, 2021

Related U.S. Application Data

(63) Continuation of application No. 15/894,725, filed on Feb. 12, 2018, now Pat. No. 11,080,285, which is a continuation of application No. 14/675,290, filed on Mar. 31, 2015, now Pat. No. 9,892,167.

(51) Int. Cl.
| | |
|---|---|
| *G06F 16/2457* | (2019.01) |
| *G06F 16/248* | (2019.01) |
| *G06F 16/28* | (2019.01) |
| *G06F 16/738* | (2019.01) |
| *G06F 16/74* | (2019.01) |
| *G06F 16/95* | (2019.01) |

(52) U.S. Cl.
CPC ...... *G06F 16/24578* (2019.01); *G06F 16/248* (2019.01); *G06F 16/285* (2019.01); *G06F 16/738* (2019.01); *G06F 16/74* (2019.01); *G06F 16/95* (2019.01)

(58) Field of Classification Search
CPC ........... G06F 17/3053; G06F 17/30861; G06F 17/30837; G06F 17/30598; G06F 17/30554; G06F 17/30846; G06F 16/24578; G06F 16/248; G06F 16/285; G06F 16/738; G06F 16/74; G06F 16/95
See application file for complete search history.

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward et al. | |
| 7,761,892 B2 | 7/2010 | Ellis et al. | |
| 8,046,801 B2 | 10/2011 | Ellis et al. | |
| 8,204,897 B1 | 6/2012 | Djabarov et al. | |
| 8,370,362 B2 * | 2/2013 | Szabo ................ | G06Q 30/0226 707/739 |

(Continued)

FOREIGN PATENT DOCUMENTS

WO    2010078523 A1    7/2010

OTHER PUBLICATIONS

PCT International Search Report PCT/US2016/024700 dated Jun. 29, 2016 (15 pages).

*Primary Examiner* — Albert M Phillips, III
(74) *Attorney, Agent, or Firm* — Haley Guiliano LLP

(57) ABSTRACT

Methods and systems are disclosed herein for a media guidance application that intuitively and efficiently allows a user to navigate a large amount of media content on a variety of user devices. Specifically, the media guidance application may provide a user with cluster-based search results. The media guidance application may intelligently select the clusters presented to a user, and attributes of those clusters, in order to assist the user in navigating the available content.

20 Claims, 10 Drawing Sheets

(56) References Cited

U.S. PATENT DOCUMENTS

| | | | |
|---|---|---|---|
| 8,423,538 B1* | 4/2013 | Sadikov | G06F 16/90335 |
| | | | 707/706 |
| 8,880,547 B1 | 11/2014 | Mills et al. | |
| 8,990,193 B1* | 3/2015 | Reynar | G06Q 30/02 |
| | | | 707/726 |
| 9,875,284 B1* | 1/2018 | Amacker | G06F 16/24578 |
| 9,892,167 B2 | 2/2018 | Patel | |
| 9,953,011 B1* | 4/2018 | Anderson | G06F 40/106 |
| 2005/0251827 A1 | 11/2005 | Ellis et al. | |
| 2007/0061363 A1 | 3/2007 | Doughty et al. | |
| 2007/0214480 A1 | 9/2007 | Kamen | |
| 2008/0109285 A1* | 5/2008 | Reuther | G06Q 30/0242 |
| | | | 707/999.005 |
| 2011/0060738 A1 | 3/2011 | Gates et al. | |
| 2012/0105489 A1 | 5/2012 | Monroe et al. | |
| 2014/0053209 A1 | 2/2014 | Young et al. | |
| 2014/0365481 A1* | 12/2014 | Novosel | G06F 16/951 |
| | | | 707/728 |
| 2015/0033258 A1 | 1/2015 | Klappert et al. | |
| 2015/0039620 A1* | 2/2015 | Ning | G06F 16/4387 |
| | | | 707/740 |
| 2015/0293925 A1 | 10/2015 | Greenzeiger et al. | |
| 2015/0304437 A1* | 10/2015 | Vaccari | H04L 67/535 |
| | | | 709/204 |
| 2016/0170578 A1 | 6/2016 | Angermayer | |
| 2016/0292159 A1 | 10/2016 | Patel | |
| 2021/0326349 A1 | 10/2021 | Patel | |

* cited by examiner

700

730

760

METHODS AND SYSTEMS FOR GENERATING CLUSTER-BASED SEARCH RESULTS

CROSS-REFERENCE TO RELATED APPLICATIONS

This application is a continuation of U.S. patent application Ser. No. 15/894,725, filed Feb. 12, 2018, which is a continuation of U.S. patent application Ser. No. 14/675,290, filed Mar. 31, 2015, (now U.S. Pat. No. 9,892,167), which are hereby incorporated by reference herein in their entireties.

BACKGROUND

In conventional systems, users have access to a plethora of media content. Even though users have access to such a wealth of content, users are still limited in the techniques that they may use to search the content. Due to the limited techniques available, users may not know that the content they wish to access is available and, consequently, fail to access that content. Furthermore, advances in mobile technology has allowed users to access content on devices on which they previously could not. However, many devices may include smaller screen sizes and specialized user interfaces (e.g., touchscreens) that may further limit the search techniques available to the user.

SUMMARY

Accordingly, methods and systems are disclosed herein for a media guidance application that intuitively and efficiently allows a user to navigate a large amount of media content on a variety of user devices. Specifically, the media guidance application may provide a user with cluster-based search results. The media guidance application may intelligently select the clusters presented to a user, and attributes of those clusters, in order to assist the user in navigating the available content. For example, in response to a search terms (e.g., "John"), the media guidance application may generate a plurality of clusters, each of which corresponds to a category associated with the search term (e.g., movies featuring actors named "John," television shows featuring actors named "John," movies featuring the word "John" in the title, etc.). Furthermore, a size selected for each cluster may depend on the particular user device used to access the search results. For example, the media guidance application may determine that search results presented on a small mobile device should feature clusters with fewer search results as the size of the mobile device may make navigating large clusters more difficult.

In some aspects, a media guidance application may receive a sequence of alphanumeric characters. For example, the media guidance application may receive a plurality of user inputs, each of which corresponds to a particular letter in a word. The media guidance application may then determine an electronic device for presenting the received sequence of alphanumeric characters. For example, the media guidance application may determine whether the electronic device is a smartphone, television, tablet, etc.

As each alphanumeric character of the sequence is received, the media guidance application may generate for display a cluster in an interactive dial based on the received sequence of alphanumeric characters, wherein the first interactive dial comprises a media item. For example, the media guidance application may generate a scrollable cluster featuring one or more media listings corresponding to the alphanumeric characters (e.g., letters) in a search term (e.g., a name of an actor). Furthermore, the media guidance application may determine a size of the cluster based on the electronic device. For example, the size of the cluster may differ depending on whether the cluster is presented on a smartphone or a television.

In some embodiments, the media guidance application may generate for display one or more graphics corresponding to media items in the cluster. For example, if a media item corresponds to the name of a particular actor, the media guidance application may present an image of the actor. Likewise, the media guidance application may present other information that may help identify content associated with the media item.

In some embodiments, the media guidance application may combine each alphanumeric character of the sequence with previously received alphanumeric characters of the sequence and cross-reference the combination with a database to identify a media item group corresponding to the combination. For example, as more alphanumeric characters are received, the media guidance application may continually update the cluster, replace the cluster with a new cluster, and/or simultaneously display another cluster. The media guidance application may then determine a plurality of clusters between media items in the media item group. For example, the media guidance application may categorize all the media items into clusters that may be individually scrolled through by the user.

The media guidance application may then rank each cluster of the plurality of clusters based on a number of the media items in the media item group corresponding to that cluster. For example, a first cluster (e.g., corresponding to media items featuring the search term in the title) that may include five media items may be ranked lower than a second cluster (e.g., corresponding to media items featuring the search term in the cast and/or crew) that includes ten media items. Based on the ranking, the media guidance application may generate for display the first cluster of the plurality of clusters in the first interactive dial and a second cluster of the plurality of clusters in a second interactive dial on a display screen. For example, the media guidance application may generate for display the higher-ranked cluster in an interactive dial that is more prominently located, sized, and/or graphically accentuated.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DISCLOSURE OF THE DRAWINGS

Figure 1:
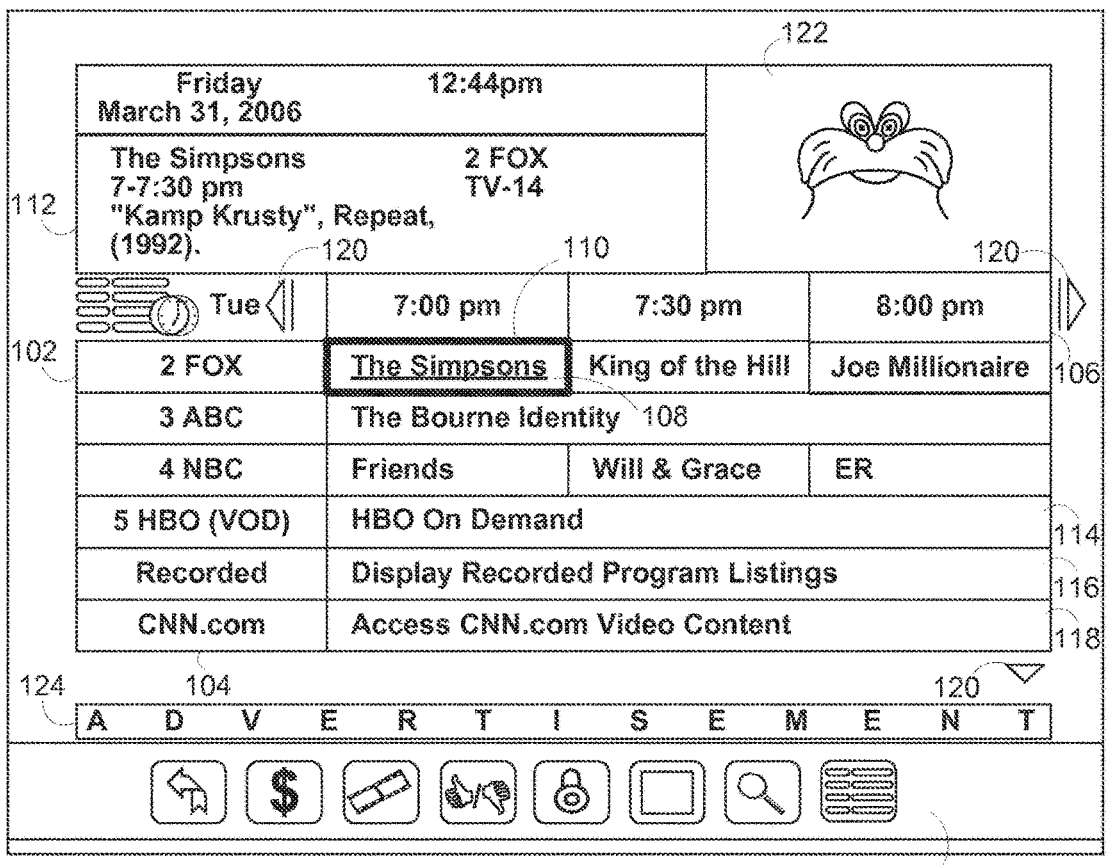
FIG. 1 shows an illustrative example of a display screen generated by a media guidance application in accordance with some embodiments of the disclosure.

Methods and systems are disclosed herein for a media guidance application that intuitively and efficiently allows a user to navigate a large amount of media content on a variety of user devices. Specifically, the media guidance application may provide a user with the search results in specialized clusters. For example, in response to a search terms (e.g., "Action"), the media guidance application may generate a plurality of clusters, each of which corresponds to a category associated with the search term (e.g., movies in the "Action" genre, movies featuring the word "Action" in the title, etc.). Furthermore, the clusters may be specialized based on the device of a user, the number of media items in a cluster, the popularity of a cluster, etc.

For example, a size selected for each cluster may depend on the particular user device used to access the search results. For example, in order to ensure easy navigation, the media guidance application may modify the number of media items in a cluster based on the number of media items that may easily be scrolled through on a particular device. In another example, the media guidance application may present one or more clusters based on a rank associated with that cluster. In such cases, the media guidance application may rank clusters based on the number of media items in a cluster. In yet another example, the media guidance application may present one or more clusters based on the popularity of a cluster. In such cases, the media guidance application may rank clusters based on the frequency at which a media item in that cluster is selected.

As referred to herein, a "media guidance application" or a "guidance application" is an application that allows a user to navigate to and access media content through an interface. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

The media guidance application and/or any instructions for performing any of the embodiments discussed herein may be encoded on media. Computer readable media includes any media capable of storing data. The computer readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media cards, register memory, processor caches, Random Access Memory ("RAM"), etc.

As referred to herein, a "cluster" is a group of media items in which each media item of the group shares a common trait. For example, a cluster may include a group of media items that belong to the same genre, feature a particular actor, etc. It should be noted, in some embodiments, a single media item may belong to multiple clusters.

Each cluster may relate to one or more criteria. For example, the criteria of a cluster may indicate how media items selected for that cluster should relate to the alphanumeric input. For example, criteria for a cluster may indicate that media items in the cluster should correspond to actors with names corresponding to the received alphanumeric input. In another example, criteria for a cluster may indicate that media items in the cluster should correspond to a genre that corresponds to the received alphanumeric input.

In some embodiments, the media guidance application may determine the criteria for a cluster based on a user input. For example, the media guidance application may receive a user input that indicates that a first cluster should have a first criterion and a second cluster should have a second criterion. In some embodiments, the media guidance application may determine the criteria for a cluster without receiving a user input. For example, the media guidance application may select the criteria for a cluster based on popularity, information in a user profile, or industry standards (e.g., based on prior click-stream data, prior user surveys, prior user search history, etc.).

As referred to herein, a "media item" is a media asset or media content, including, but not limited to media content that refers to, or is associated with, other media content (e.g., a media listing). For example, a media item may be a media listing that corresponds to a media asset, a link to additional information, a selectable icon that causes the media guidance application to perform a function, etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
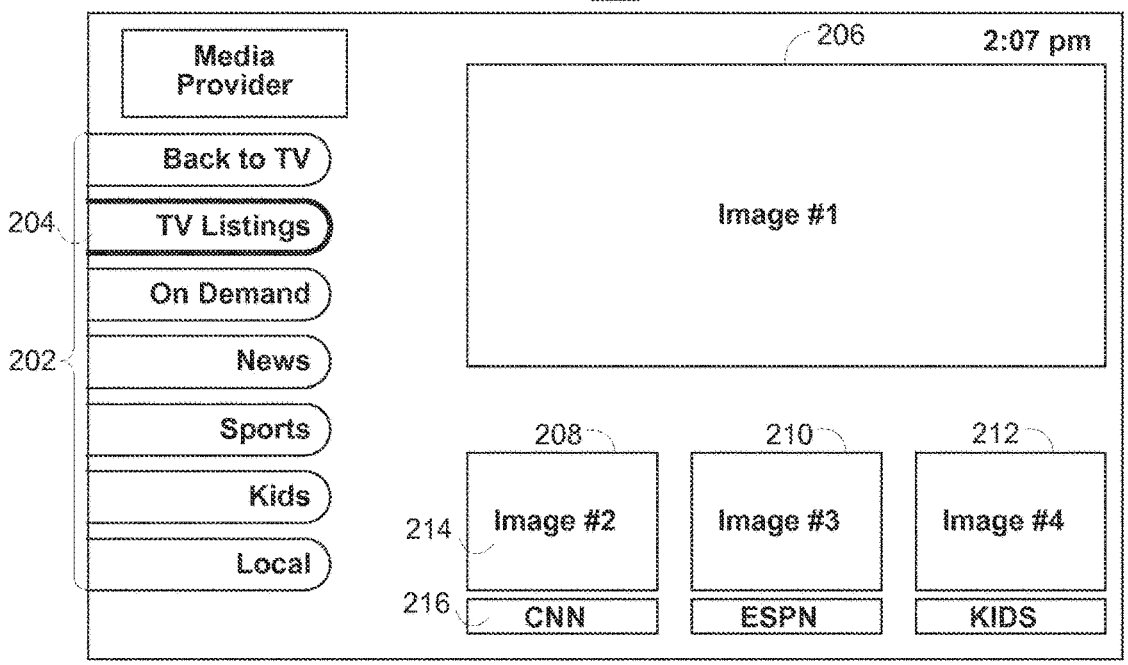
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
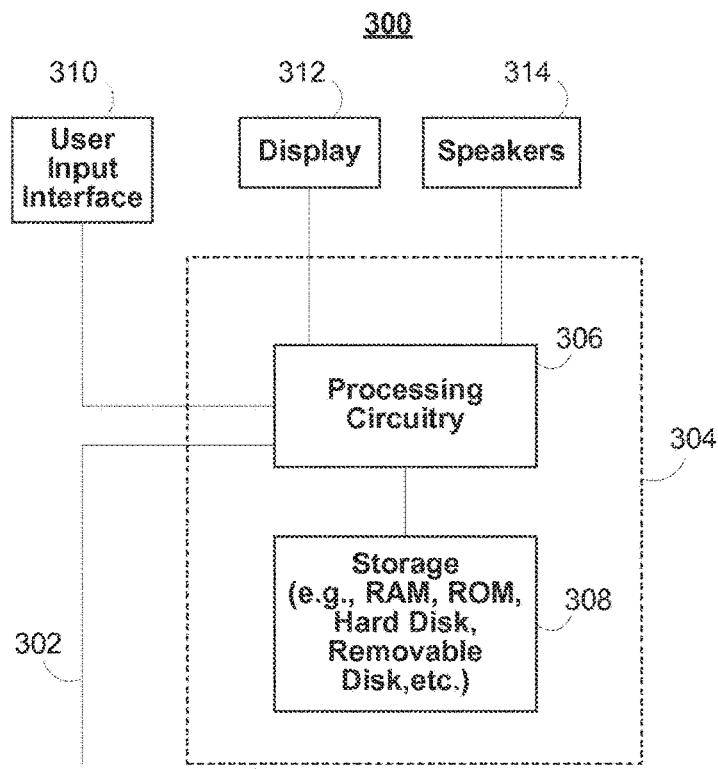
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
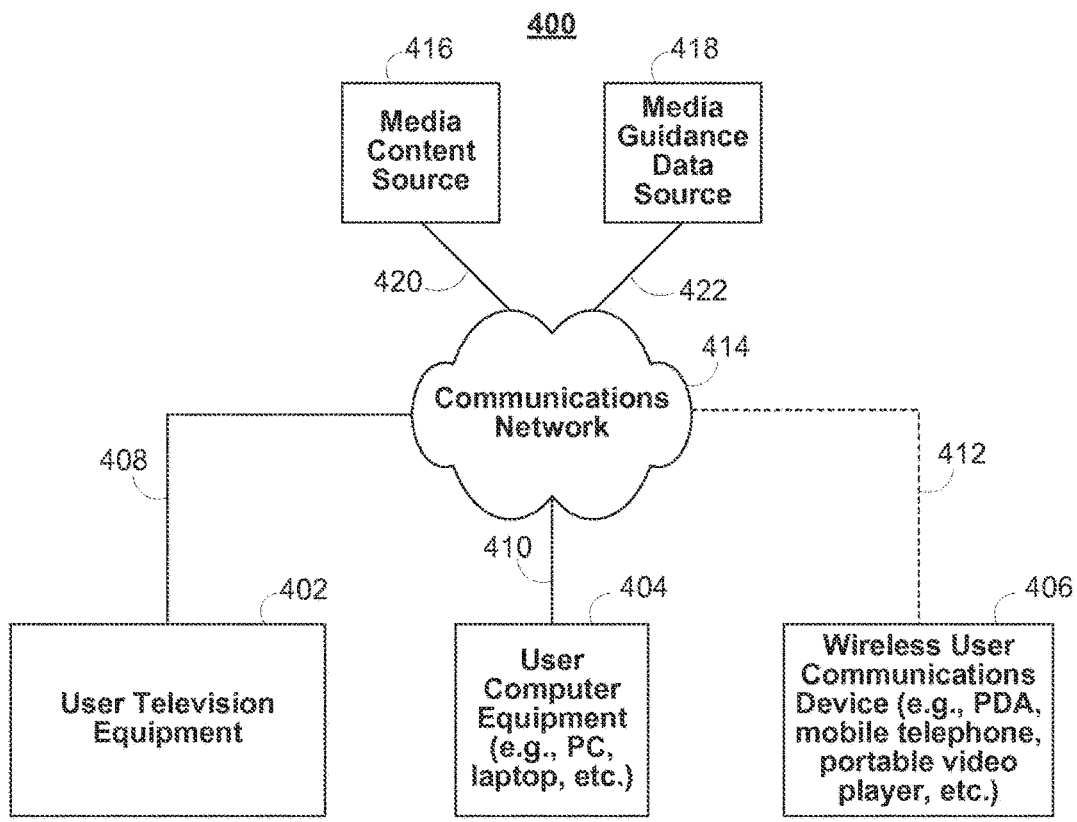
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
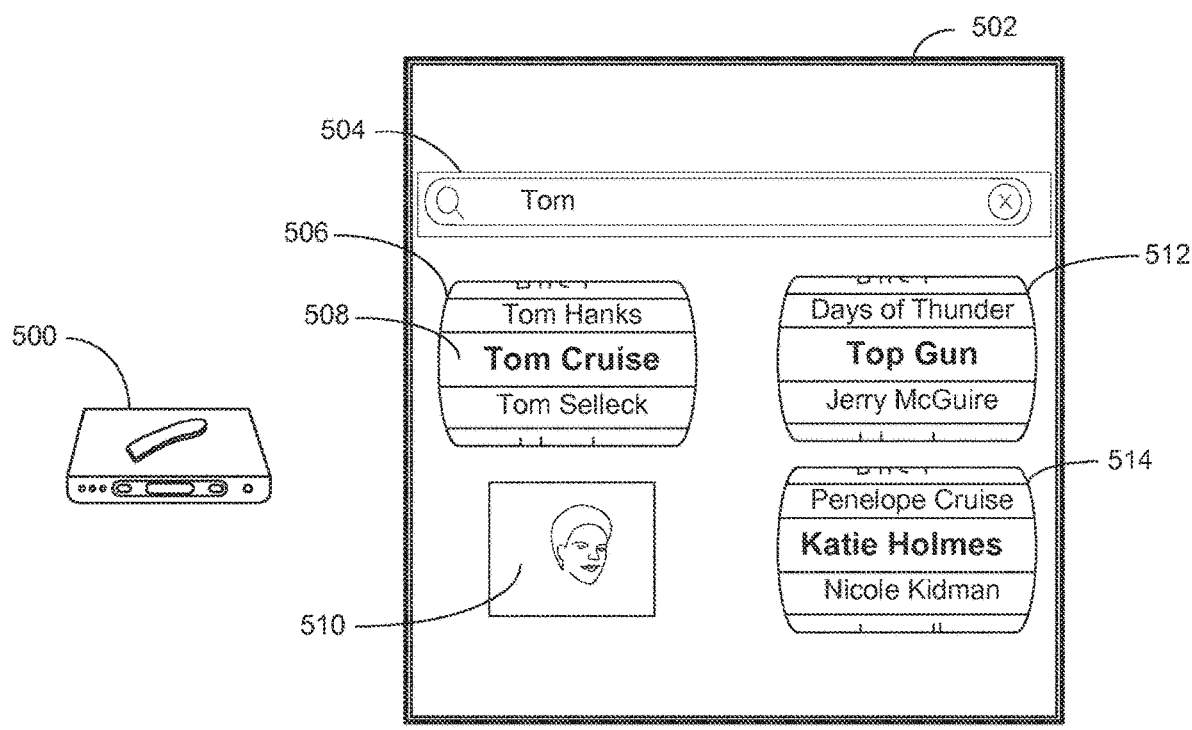
FIG. 5 shows an illustrative example of a plurality of devices featuring clusters of media items in accordance with some embodiments of the disclosure.
Figure 5:
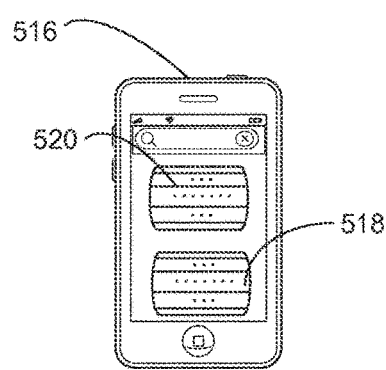

FIG. 5 shows an illustrative example of a plurality of devices featuring clusters of media items in accordance with some embodiments of the disclosure. In FIG. 5 user device 500 and user device 516 are shown. For example, user device 500 is a set-top box, which is currently generating for display a plurality of cluster-based search results on display screen 502. For example, in response to a user inputting (e.g., via user input interface 310 (FIG. 3)) the alphanumeric characters "t," "o," and "m" (e.g., corresponding to the word/name "Tom") into search field 504, the media guidance application has generated for display clusters 506, 512, and 514. Furthermore, as shown in FIG. 5, clusters 506, 512, and 514 are currently displayed in a series of interactive dials.

For example, each of the interactive dials corresponding to clusters 506, 512, and 514 may be scrolled through in response to one or more user inputs (e.g., received via user input interface 310 (FIG. 3)). For example, each cluster (e.g., cluster 506, 512, and 514) may include a plurality of media items (e.g., media item 508). In order for the user to navigate between both different clusters and different media items within a cluster, the media guidance application may receive user inputs from the user. In some embodiments, such inputs may be received from a user input interface (e.g., user input interface 310 (FIG. 3) and/or an eye contact detection component (e.g., as discussed in relation to FIG. 8) or brain activity monitoring component (e.g., as discussed in relation to FIG. 9)).

In response to the alphanumeric characters entered in search field 504, the media guidance application has determined a group of media items (e.g., actors, movies, etc., which correspond to the word "Tom"). For example, the media guidance application may cross-reference a database (e.g., located at storage 308 (FIG. 3) and/or any location accessible via communications network 414 (FIG. 4)) listing all available media items. The media guidance application may filter (e.g., via control circuitry 304 (FIG. 3)) the available media items based on whether or not the media items correspond to the word "Tom." If so, the media guidance application determines one or more additional characteristics (e.g., a genre, an actor, etc.) about each of the media items corresponding to the word "Tom." The media guidance application may then select one or more clusters (e.g., via control circuitry 304 (FIG. 3)) for each of the media items corresponding to the word "Tom." For example, cluster 506 may correspond to actors named "Tom." Cluster 512 may correspond to movies featuring actors named "Tom." Cluster 514 may correspond to people associated with people named "Tom."

In some embodiments, the media guidance application may intelligently select the clusters presented to a user, and attributes of those clusters, in order to assist the user in navigating the available content. For example, clusters 506, 512, and 514 may represent the most popular clusters (e.g., based on click-stream data, user surveys, prior user search history, etc.). Additionally or alternatively, clusters 506, 512, and 514 may represents the clusters featuring the largest number of media items. For example, within the group of media items corresponding to the word "Tom," the largest number of media items within that group may be in a cluster of media items corresponding to actors named "Tom."

In cluster 506, media item 508 is currently selected. In response to the selection of media item 508, the media guidance application may have generated from simultaneous display cluster 512 and/or 514. Additionally or alternatively, the media items presented in clusters 512 and 514 may have changed in response to a selection of media item 508.

The media guidance application also generates for display image 510. For example, image 510 may correspond to media item 508. In response to a user selection of media item 508, the media guidance application may generate for display image 510. In some embodiments, the media guidance application may generate for display multiple images and/or other content associated with a media item. Furthermore, the media guidance application may organize this content near the media item in the cluster such that a user may identify the media item associated with the content. For example, the media guidance application may generate for display an image next to each media item in cluster 506.

In some embodiments, a size selected for each cluster may depend on the particular user device used to access the search results. For example, the media guidance application may determine that search results presented on a small mobile device should feature clusters with fewer search results as the size of the mobile device may make navigating large clusters more difficult. Accordingly, the media guidance application may select clusters that feature fewer media items as opposed to clusters that feature more media items. For example, the clusters may be more narrowly tailored and correspond to characteristics associated with fewer media items. Alternatively, in order to reduce the size of a cluster, the media guidance application may remove one or more media items from the cluster. For example, if ten actors correspond to the word "Tom," the media guidance application may remove five of those actors in order to reduce the size of the cluster.

For example, cluster 506 may correspond to actors corresponding to the word "Tom." Likewise, cluster 520 on user device 516 may correspond to actors corresponding to the word "Tom." However, because user device 500 is associated with a larger display screen (e.g., display screen 502) or associated with a different user input interface than user device 516, cluster 520 may include fewer media items than cluster 508.

In some embodiments, cluster 520 may represent an abbreviated version of cluster 506. For example, user device 500 may present more clusters (e.g., three) as opposed to user device 516 (e.g., two) despite receiving the same alphanumeric characters and subsequent user inputs. For example, the media guidance application may generate for display clusters 512 and 514 in response to a user selection of media item 508 on user device 500, but the media guidance application may only generate for display cluster 518 on user device 516 in response to the same inputs.

In some embodiments, user device 500 and user device 516 may be used in concert. For example, the media guidance application may be configured to receive commands from both user device 500 and 516. Furthermore, commands received at user device 500 and/or user device 516 may affect content presented via user device 500 and/or user device 516. For example, a selection of a media item in cluster 520 may affect the clusters simultaneously displayed on display screen 502.

In some embodiments, the media guidance application may select which media items to remove based on popularity of the media items, the number of characteristics associated with a particular media item that did or did not meet the cluster criteria, etc. In some embodiments, the media guidance application may provide the user an option to access the removed media items. For example, after scrolling the interactive dial, the user may be presented with an option to access the media items that were removed or for the cluster to be populated with the removed media items.

Figure 6:
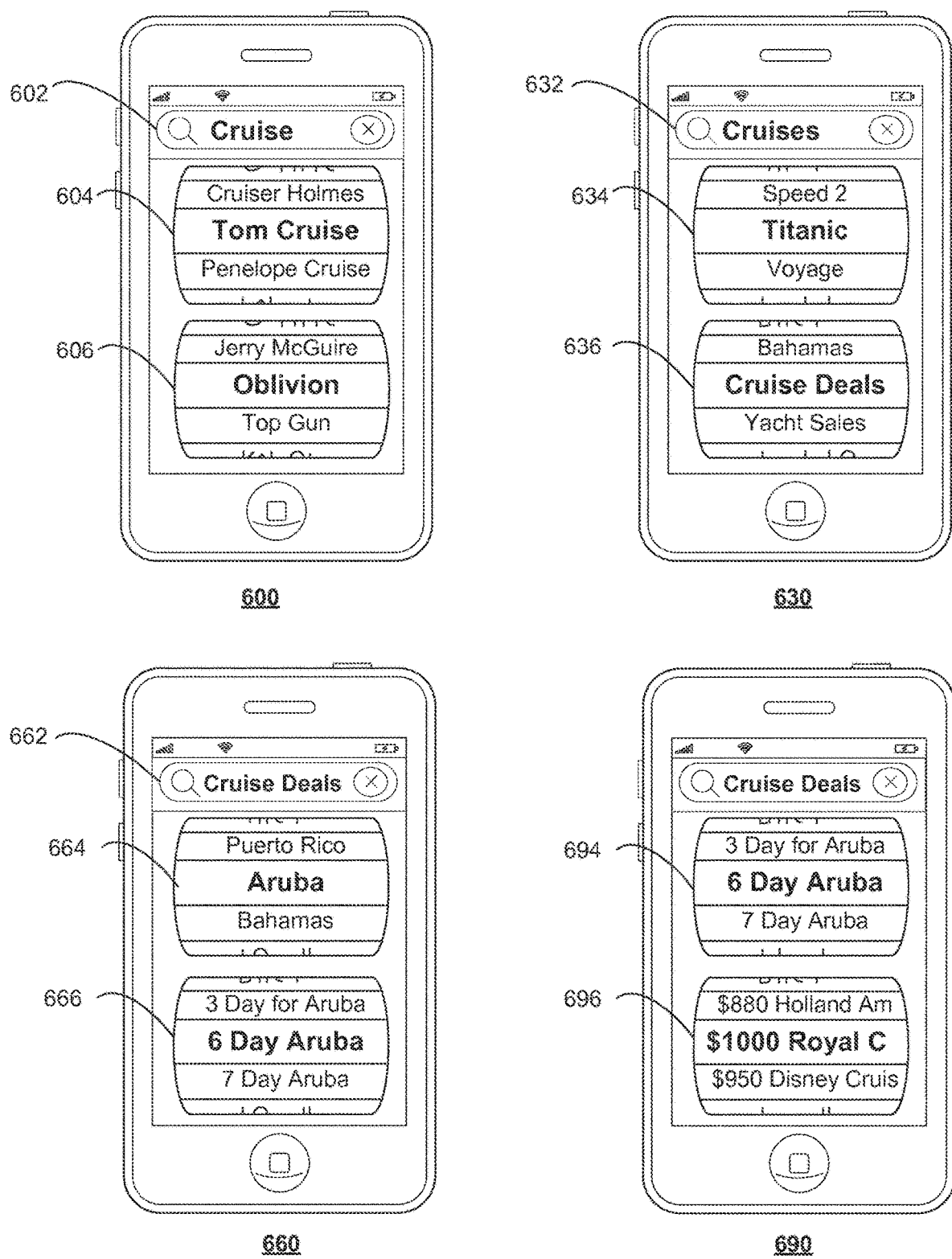
FIG. 6 is an illustrative example of a user device updating a cluster based on user selections in accordance with some embodiments of the disclosure.

FIG. 6 is an illustrative example of a user device updating a cluster based on user selections in accordance with some embodiments of the disclosure. For example, user device 600, 630, 660, and 690 may represent the same user device as the clusters and media items within each cluster are modified and updated in response to a series of user inputs.

User device 600 includes two clusters (e.g., cluster 604 and cluster 606) that have been generated for display by a media guidance application in response to receiving a sequence of alphanumeric characters (e.g., "c," "r," "u," "i," "s," and "e") in search field 602. For example, the media guidance application may access a database (e.g., located at storage 308 (FIG. 3) and/or any location accessible via communications network 414 (FIG. 4)) listing available media items. In response to the user inputs, the media guidance application may filter (e.g., via control circuitry 304 (FIG. 3)) the available media items based on whether or not an available media item corresponds to the user inputs. For example, in response to receiving a sequence of alphanumeric characters that spell "Cruise," the media guidance application may generate for display cluster 604, which corresponds to actors and actresses named "Cruise." In addition, the media guidance application has generated for display cluster 606, which corresponds to movies in which "Tom Cruise" appears.

For example, the criteria for cluster 604 may be media items (e.g., listings) corresponding to actors or actresses named "Cruise." The criteria for cluster 606 may be media items (e.g., listings) corresponding to movies that feature "Tom Cruise." In some embodiments, the criteria for cluster 604 and cluster 606 (e.g., how each cluster should related to the alphanumeric input) may be selected by the media guidance application. For example, the media guidance application may select the most popular clusters (e.g., based on click-stream data, user surveys, prior user search history, etc.).

In some embodiments, the criteria for cluster 606 may depend on the media item selected in cluster 604. For example, in cluster 604 a media item corresponding to "Tom Cruise" is currently selected. In response, the media guidance application may present movies featuring "Tom Cruise" in cluster 606. Moreover, a user interaction (e.g., scrolling the media items) within cluster 604 may cause the media guidance application to update and/or modify the media items in cluster 606. For example, a user selection of "Penelope Cruise" in cluster 604 may cause the media guidance application to generate for display movies featuring "Penelope Cruise" in cluster 606.

User device 630 shows clusters 634 and 636, which may correspond to clusters generated for display after a user enters an additional alphanumeric character into search field 632 (e.g., as compared to the alphanumeric characters entered into search field 602). For example, in response to receiving an additional "s" alphanumeric character, the alphanumeric characters in search field 632 includes "c," "r," "u," "i," "s," "e," and "s," which when combined, spell "cruises." Based on the additional, alphanumeric character, the media guidance application has modified the displayed clusters and/or the media items within the displayed clusters.

For example, the criteria for cluster 634 may now include movies about cruises, whereas the criteria for cluster 636 may include advertisements and/or purchasing opportunities related to cruises. For example, the criteria for cluster 634 and cluster 636 may combine both the context of the alphanumeric characters received in search field 632 (e.g., available media items corresponding to the received alphanumeric characters) and the most popular and/or largest clusters of media items associated with the alphanumeric characters. For example, while most users may prefer a list of movies featuring "Tom Cruise" when "Cruise" is entered into a search field, most users may prefer movies featuring boats when "Cruises" is entered into a search field.

User device 660 includes two clusters (e.g., cluster 664 and cluster 666). The media guidance application may have generated for display cluster 664 and cluster 666 in response to a user selecting "Cruise Deals" from cluster 636. For example, in response to a user selecting "cruise deals" from cluster 636, the alphanumeric characters in search field 662 may have been updated. Additionally or alternatively, clusters 664 and 666, and media items presented in clusters 664 and 666, have been updated.

For example, the criterion associated with cluster 664 is now location of cruises, whereas the criterion for cluster 666 is now cruise deals in the location selected in cluster 664. Moreover, a user interaction (e.g., scrolling the media items) within cluster 664 may cause the media guidance application to update and/or modify the media items in cluster 666. For example, a user selection of "Bahamas" in cluster 664, may cause the media guidance application to generate for display cruises located in the Bahamas in cluster 666.

Finally, user device 690 represents the clusters generated for display by the media guidance application upon a user selection of "6 Day Aruba" in cluster 666. For example, in response to the user selection, the content of cluster 666 has been moved to a more prominent location, the content of cluster 664 has been removed, and cluster 696 has been generated for display. The criteria of cluster 696 may relate to prices and providers of six-day cruises in Aruba, as indicated by "6 Day Aruba" being highlighted in cluster 694.

Figure 7:
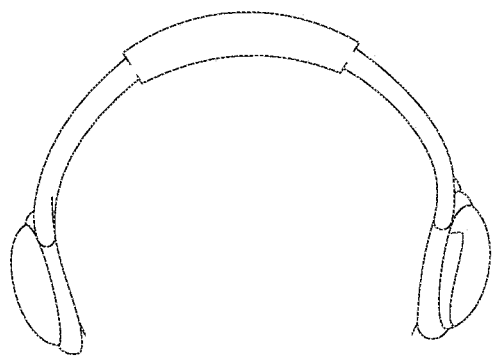
FIG. 7 shows illustrative embodiments of user devices used to select media items in accordance with some embodiments of the disclosure.
Figure 7:
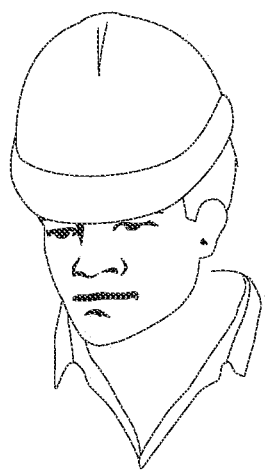
Figure 7:
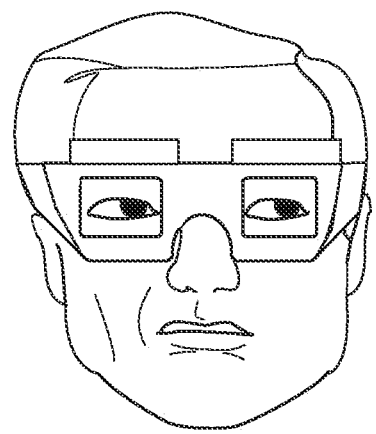

FIG. 7 shows illustrative embodiments of user devices used to select media items in accordance with some embodiments of the disclosure. For example, the user devices (e.g., user devices 700, 730, and 760) may be used to determine a gaze point (e.g., as discussed in relation to FIG. 8) or current brain activity as discussed in relation to FIG. 6, which shows multiple user devices that may be associated with monitoring brain activity. For example, the user devices (e.g., user devices 700, 730, and 760) may work in concert with another user device (e.g., user device 500 (FIG. 5)) in order to generate for display one or more clusters.

A user device (e.g., upon which a media guidance application is implemented and/or which a media guidance application is in communication with) may be fashioned as a form of headwear. For example, user device 700 is fashioned as a headset, user device 730 is fashioned as a hat/helmet, and user device 760 is fashioned as eyeglasses. It should be noted that a user device configured to determined a gaze point of a user, monitor brain activity of a user, or otherwise select, navigate, or provide information for a cluster as described herein may be fashioned as any headwear. Furthermore, in some embodiments, a user device may not be fashioned as headwear, but instead may be configured as any device capable of determining a gaze point of a user, monitoring brain activity of a user, or otherwise selecting, navigating or providing information for a cluster.

Figure 8:
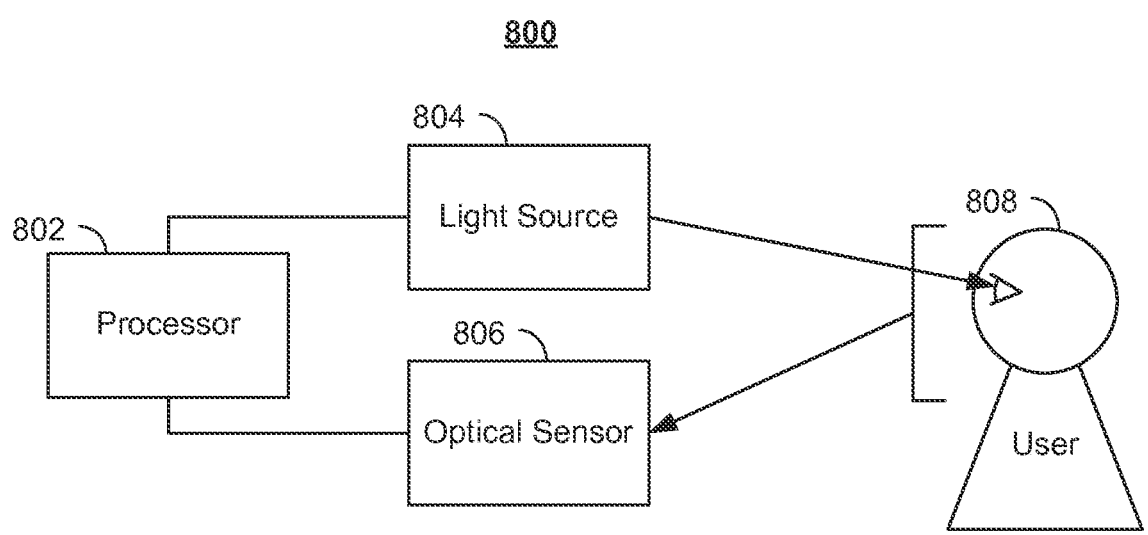
FIG. 8 shows an illustrative system form determining a gaze point of a user in accordance with some embodiments of the disclosure.

In some embodiments, user devices 700, 730, and 760 may further include additional sub-components (e.g., in communication with control circuitry 304 (FIG. 3)), which may monitor eye contact of a user (e.g., as discussed in relation to FIG. 8). Sub-components may include lenses, light sources, or other features that may be used to determine whether or not a user is making eye contact.

Figure 9:
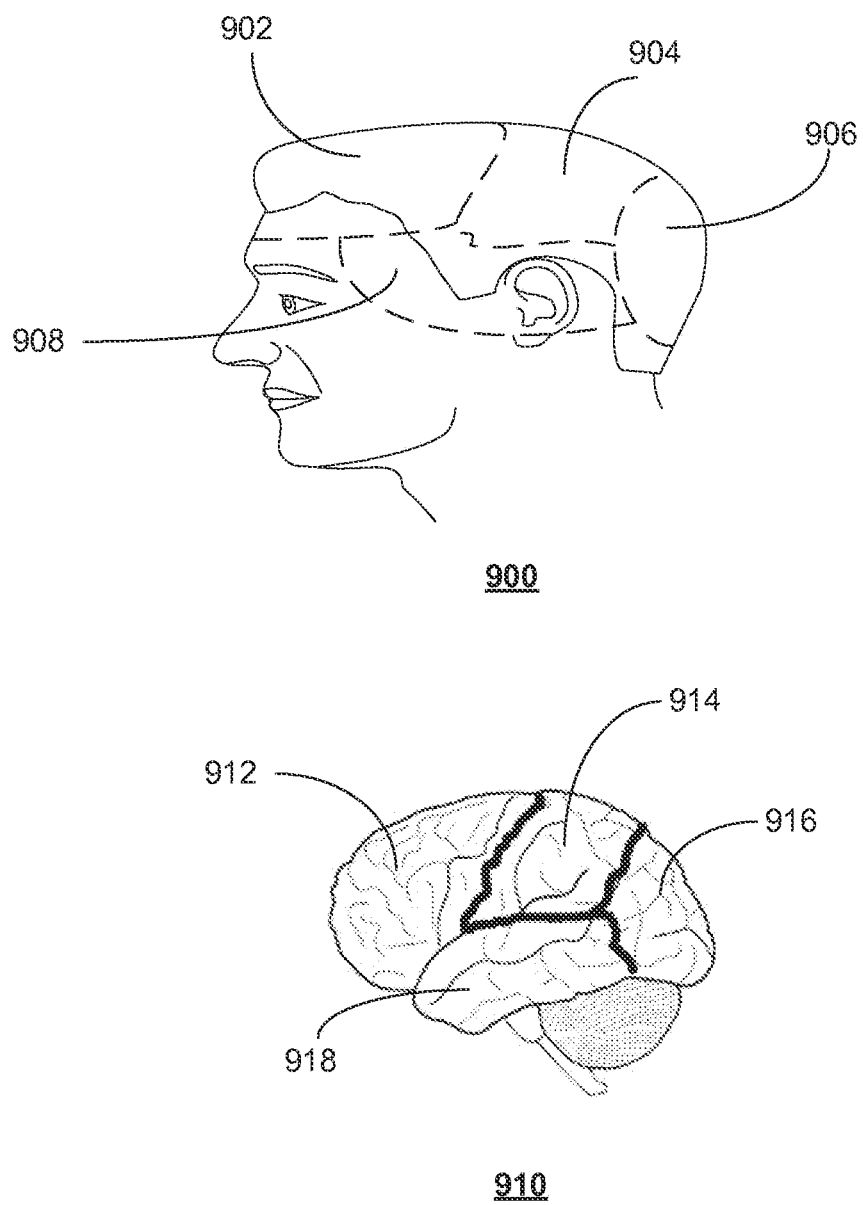
FIG. 9 shows a representation of a user and regions of the brain of the user associated with monitoring brain activity in accordance with some embodiments of the disclosure.

In some embodiments, user devices 700, 730, and 760 may further include additional sub-components (e.g., in communication with control circuitry 304 (FIG. 3)), which may monitor brain activity on one or more regions of the brain (e.g., as discussed in relation to FIG. 9). Sub-components may include electrodes or other features that may attach to the various portions (e.g., portions 902, 904, 906, and 908 (FIG. 9)) of a user (e.g., user 900 (FIG. 9)). Furthermore, in some embodiments, sub-components may extend and/or retract during various modes of the user device in order to accommodate the comfort of the user.

In some embodiments, user devices 700, 730, and 760 may be battery-powered in order to provide a user with additional mobility. Furthermore, user devices 700, 730, and 760 include multiple modes, each corresponding to different power consumption levels and/or sensitivity levels.

FIG. 8 shows an illustrative system form determining a gaze point of a user in accordance with some embodiments of the disclosure. FIG. 8 shows eye contact detection component 800, which may be used to identify the gaze point of a user (e.g., operating user device 500 (FIG. 5)), in order to determine whether or not a user is currently looking at a particular cluster. Eye contact detection component 800 includes processor 802, light source 804, and optical sensor 806. Light source 804 transmits light that reaches at least one eye of a user, and optical sensor 806 is directed at the user to sense reflected light. Optical sensor 806 transmits collected data to processor 802, and based on the data received from optical sensor 806, processor 802 determines a user's gaze point.

In some embodiments, eye contact detection component 800 is configured for determining a gaze point of a single user. In other embodiments, eye contact detection component 800 may determine gaze points for a plurality of users. Eye contact detection component 800 may identify multiple users of a user device (e.g., user device 500 (FIG. 5)).

Processor 802 may be integrated with one or more light sources 804 and one or more optical sensors 806 in a single device. Additionally or alternatively, one or more light sources 804 and one or more optical sensors 806 may be housed separately from processor 802 and in wireless or wired communication with processor 802. One or more of processors 802, light sources 804, and optical sensors 806 may be integrated into user equipment device 300 (FIG. 3).

Processor 802 may be similar to processing circuitry 306 (FIG. 3) described above. In some embodiments, processor 802 may be processing circuitry 306 (FIG. 3), with processing circuitry 306 in communication with light source 804 and optical sensor 806. In other embodiments, processor 802 may be separate from but optionally in communication with processing circuitry 306 (FIG. 3).

Light source 804 transmits light to one or both eyes of one or more users. Light source 804 may emit, for example, infrared (IR) light, near infrared light, or visible light. The light emitted by light source 804 may be collimated or non-collimated. The light is reflected in a user's eye, forming, for example, the reflection from the outer surface of the cornea (i.e., a first Purkinje image), the reflection from the inner surface of the cornea (i.e., a second Purkinje image), the reflection from the outer (anterior) surface of the lens (i.e., a third Purkinje image), and/or the reflection from the inner (posterior) surface of the lens (i.e., a fourth Purkinje image).

Optical sensor 806 collects visual information, such as an image or series of images, of one or both of one or more users' eyes. Optical sensor 806 transmits the collected image(s) to processor 802, which processes the received image(s) to identify a glint (i.e., corneal reflection) and/or other reflection in one or both eyes of one or more users. Processor 802 may also determine the location of the center of the pupil of one or both eyes of one or more users. For each eye, processor 802 may compare the location of the pupil to the location of the glint and/or other reflection to estimate the gaze point. Processor 802 may also store or obtain information describing the location of one or more light sources 804 and/or the location of one or more optical sensors 806 relative to a display (e.g., display 312 (FIG. 3)). Using this information, processor 802 may determine a user's gaze point on a display (e.g., display 312 (FIG. 3) or a particular cluster, or processor 802 may determine whether or not a user's gaze point is on a portion of a display (e.g., display 312 (FIG. 3)).

In some embodiments, eye contact detection component 800 performs best if the position of a user's head is fixed or relatively stable. In other embodiments, eye contact detection component 800 is configured to account for a user's head movement, which allows the user a more natural viewing experience than if the user's head were fixed in a particular position.

In some embodiments accounting for a user's head movement, eye contact detection component 800 includes two or more optical sensors 806. For example, two cameras may be arranged to form a stereo vision system for obtaining a 3D position of the user's eye or eyes; this allows processor 802 to compensate for head movement when determining the user's gaze point. The two or more optical sensors 806 may be part of a single unit or may be separate units. For example, user equipment device 300 (FIG. 3) may include two cameras used as optical sensors 806, or eye contact detection component 800 in communication with user equipment device 300 (FIG. 3) may include two optical sensors 806. In other embodiments, each of user equipment device 300 (FIG. 3) and eye contact detection component 800 may include an optical sensor, and processor 802 receives image data from the optical sensor of user equipment device 300 (FIG. 3) and the optical sensor of eye contact detection component 800. Processor 802 may receive data identifying the location of optical sensor 806 relative to a display (e.g., display 312 (FIG. 3)) and/or relative to each other and use this information when determining the gaze point.

In other embodiments accounting for a user's head movement, eye contact detection component 800 includes two or more light sources for generating multiple glints. For example, two light sources 804 may create glints at different locations of an eye; having information on the two glints allows the processor to determine a 3D position of the user's eye or eyes, allowing processor 802 to compensate for head movement. Processor 802 may also receive data identifying the location of light sources 804 relative to a display (e.g., display 312 (FIG. 3)) and/or relative to each other and use this information when determining the gaze point.

In some embodiments, other types of eye contact detection components that do not utilize a light source may be used. For example, optical sensor 806 and processor 802 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of eye contact detection component 800.

It should be noted that eye contact detection component 800 is but one type of component that may be incorporated into or accessible by control circuitry 304 (FIG. 3) or the media application. Other types of components, which may generate other types of data (e.g., video, audio, textual, etc.) are fully within the bounds of this disclosure.

FIG. 9 shows a representation of a user and regions of the brain of the user associated with monitoring brain activity. For example, in some embodiments, the media guidance application may be implemented upon (or be in communication with) a user device that monitors brain activity of a user (e.g., user device 700 (FIG. 7)). The user device may reside upon the head of a user and include components (or sub-components) for testing different areas of the scalp of a user.

It should be noted that although FIG. 9 discusses performing functions based on brain activity of a user, the media guidance application may perform functions based on any biometric measurement. As used herein, "biometric measurement" refers to distinctive, measurable characteristics used to label and describe the psychological or physiological condition of a user.

Biometric measurements that may be received, managed, monitored, and/or shared by a media guidance application may include psychological characteristics related to the level of concentration, emotional state, mood, and/or pattern of behavior of a person, including but not limited to typing rhythm, gait, frequency of social interactions, voice tones, etc., or may include physiological characteristics related to the status and/or shape of the body such as height, weight, medical condition(s), heart rate, blood pressure, fingerprint, body mass index, glucose level, face description, DNA, palm print, hand geometry, iris, retina, odor/scent, and/or any other mechanical, physical, and biochemical functions of a user, his/her organs, and the cells of which they are composed.

In some embodiments, the media guidance application may determine a psychological or physiological condition of a user based on one or more biometric measurements, and use that determination to trigger the performance of a media guidance application operation. For example, the media guidance application may determine the current mood of a user based on the heart rate, drowsiness level, or current brain activity of the user. In another example, the media guidance application may determine the level of attention of a user based on current brain activity, eye contact, etc. Systems and methods for determining moods, levels of attention, and other characteristics of a user based on brain activity and/or other biometric measurements are discussed in greater detail in connection with Klappert et al., U.S. patent application Ser. No. 14/038,158, filed Sep. 26, 2013; Klappert et al., U.S. patent application Ser. No. 14/038,046, filed Sep. 26, 2013; Klappert et al., U.S. patent application Ser. No. 14/038,171, filed Sep. 26, 2013; Klappert et al., U.S. patent application Ser. No. 14/038,257, filed Sep. 26, 2013; Klappert et al., U.S. patent application Ser. No. 14/037,984, filed Sep. 26, 2013; and Klappert et al., U.S. patent application Ser. No. 14/038,044, filed Sep. 26, 2013, which are hereby incorporated by reference herein in their entireties.

In some embodiments, monitoring for biometric data may include monitoring the brain activity of a user. For example, a characteristic of brain activity may be mapped such that detection of such a characteristic triggers a particular media guidance application operation. For example, the media guidance application may monitor the user to determine whether or not a specific brain state such as the user obtaining a particular mood, a particular level of concentration, a brain activity frequency range above a threshold level, or a particular amplitude with any one frequency band, etc., is occurring. If such a brain state is detected, the media guidance application may instruct a user device to perform a particular media guidance application operation that was mapped to the detected brain state.

For example, by measuring for particular brain activity and/or in a particular region of the brain of a user, the media guidance application may determine whether or not a user is selecting, scrolling, or otherwise interacting with one or more clusters. Furthermore, the media guidance application may interpret the measured brain activity in order to identify search terms and/or more prominently display one cluster over another.

For example, the media guidance application may determine that a gaze point of a user is currently fixated on a particular cluster of a plurality of displayed clusters. Furthermore, the media guidance application may detect brain activity that indicates that a user is currently excited. Therefore, the media guidance application may determine that the user prefers the cluster upon which the gaze point of the user is fixated.

As shown in FIG. 9, the scalp of user 900 includes first portion 902, second portion 904, third portion 906, and fourth portion 908. In some embodiments, each of first portion 902, second portion 904, third portion 906, and fourth portion 908 may correspond to a different region of brain 910. For example, in some embodiments, first portion 902 may correspond to frontal lobe 912, second portion 904 may correspond to parietal lobe 914, third portion 906 may correspond to occipital lobe 916, and fourth portion 908 may correspond to temporal lobe 918.

In some embodiments, the media guidance application may perform a media guidance application operation (e.g., select a search term, scroll an interactive dial, etc.) in response to brain activity detected in a particular region of the brain of a user. For example, the media guidance application may monitor brain activity of the user in portion 902 (e.g., via user device 700 (FIG. 7)) and determine brain activity associated with frontal lobe 912. The media guidance application may then cross-reference the brain activity detected in portion 902 with a database associated with measurements of brain activity to determine if the detected brain activity in portion 902 corresponds to a particular media guidance application operation. Alternatively or additionally, the media guidance application may cross-reference the brain activity detected in portion 902 with a database associated with emotions of a user to determine if the detected brain activity in portion 902 corresponds to a particular emotion. For example, if the media guidance application determines that the detected brain activity corresponds to an emotion of "happy," the media guidance application may determine a cluster associated with the emotion (e.g., a cluster currently selected by a user or upon which a gaze point of the user is fixated). The media guidance application may then perform one or more functions based on associating the cluster with the determined emotion (e.g., graphically accentuate the cluster, relocate the cluster to a more prominent position, increase the size of the cluster, increase a number of media items in the cluster, etc.).

Figure 10:
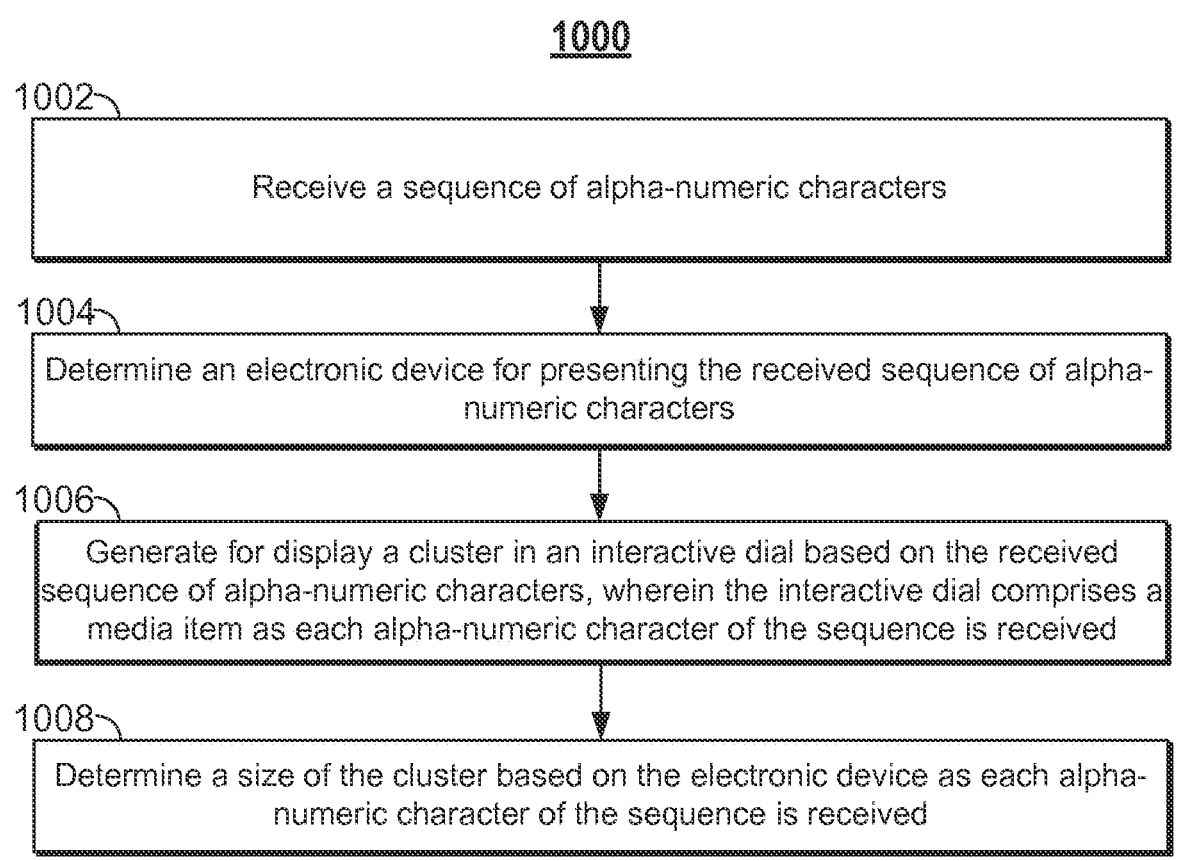
FIG. 10 is a flowchart of illustrative steps for determining a size of the cluster based on an electronic device in accordance with some embodiments of the disclosure.

FIG. 10 is a flowchart of illustrative steps for determining a size of the cluster based on an electronic device in accordance with some embodiments of the disclosure. It should be noted that process 1000 or any step thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to determine a size of the cluster based on an electronic device. In addition, one or more steps of process 1000 may be incorporated into or combined with one or more steps of any other process or embodiment.

At step 1002, the media guidance application receives a sequence of alphanumeric characters. For example, the media guidance application may receive e.g., via user input interface 310 (FIG. 3)) a plurality of user inputs, each of which corresponds to a particular letter in a word. For example, as discussed in relation to FIG. 5, the media guidance application may receive the alphanumeric characters "t," "o," and "m" (e.g., corresponding to the word/name "Tom").

At step 1004, the media guidance application determines an electronic device for presenting the received sequence of alphanumeric characters. For example, the media guidance application may determine whether the electronic device is a smartphone, television, tablet, etc. For example, the media guidance application may determine whether or not the received sequence of alphanumeric characters is being presented on user device 500 (FIG. 5) or user device 516 (FIG. 5).

At step 1006, as each alphanumeric character of the sequence is received, the media guidance application generates for display a cluster in an interactive dial based on the received sequence of alphanumeric characters, wherein the interactive dial comprises a media item. For example, the media guidance application may generate a scrollable cluster featuring one or more media listings corresponding to the alphanumeric characters (e.g., letters) in a search term (e.g., a name of an actor). Furthermore, the cluster and/or media items in the cluster may change as additional alphanumeric characters of the sequence are received.

At step 1008, the media guidance application may determine a size of the cluster based on the electronic device as each alphanumeric character of the sequence is received. For example, the size of the cluster may differ depending on whether the cluster is presented on smartphone or a television. For example, the size (e.g., the number of media items in the cluster, the dimension of the cluster as presented on a display screen, the size of a cluster relative to other clusters on the display screen, etc.) of a first cluster (e.g., cluster 506 (FIG. 5)) on a first user device (e.g., user device 500 (FIG. 5)) may differ from a second cluster (e.g., cluster 520 (FIG. 5)) on a second user device (e.g., user device 516 (FIG. 5)).

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

Figure 11:
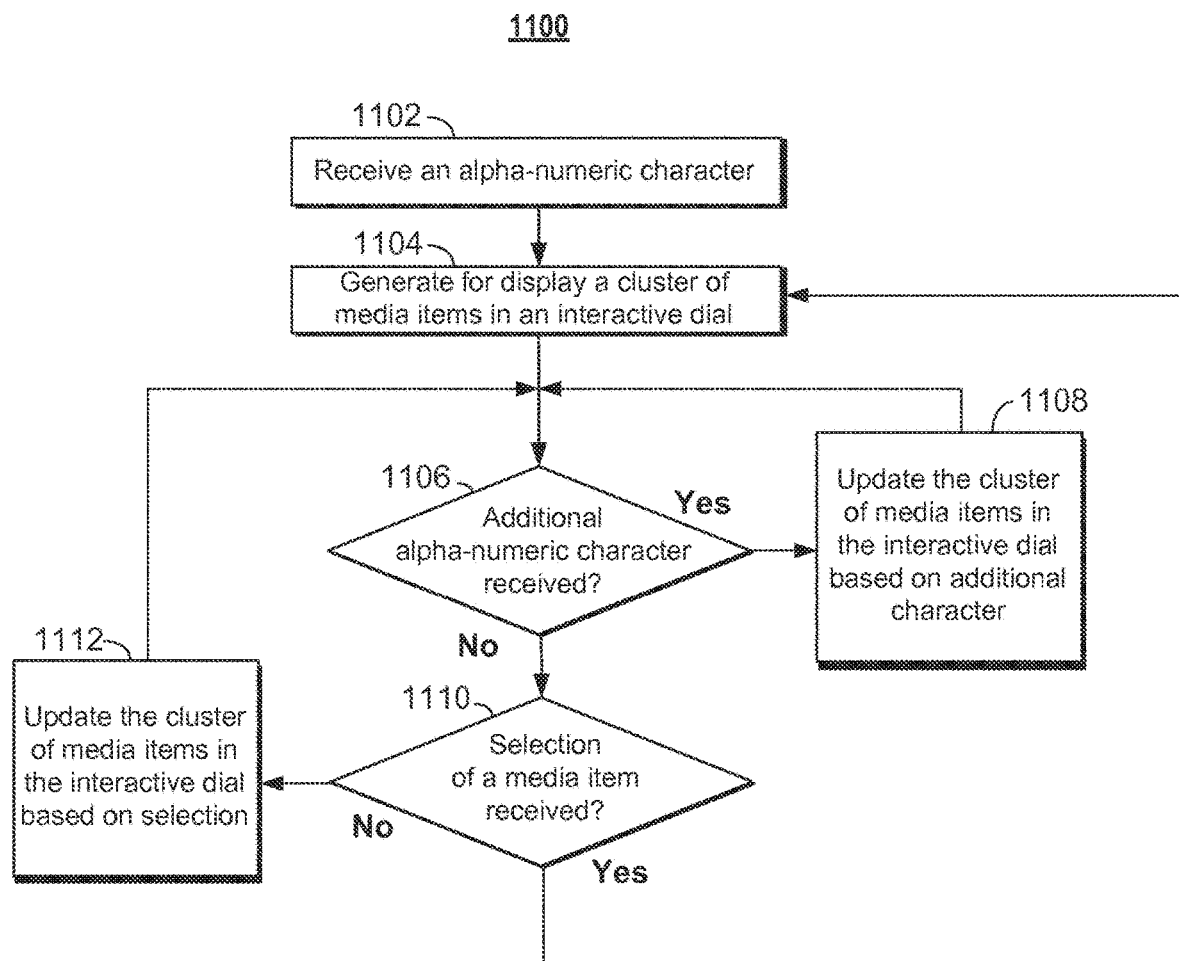
FIG. 11 is a flowchart of illustrative steps for updating a cluster based on a received alphanumeric character in accordance with some embodiments of the disclosure.

FIG. 11 is a flowchart of illustrative steps for updating a cluster based on a received alphanumeric character in accordance with some embodiments of the disclosure. It should be noted that process 1100 or any step thereof could be performed on, or provided by, any of the devices shown in FIGS. 3-4. For example, process 1100 may be executed by control circuitry 304 (FIG. 3) as instructed by a media guidance application implemented on user equipment 402, 404, and/or 406 (FIG. 4) in order to update a cluster based on a received alphanumeric character. In addition, one or more steps of process 1100 may be incorporated into or combined with one or more steps of any other process or embodiment.

At step 1102, the media guidance application receives an alphanumeric character. For example, the media guidance application may receive one or more user inputs (e.g., via user input interface 310 (FIG. 3)) representing a letter, number, and/or symbols that corresponds to media content that the user wishes to receive. For example, the media guidance application may receive one or more user inputs populating a search field (e.g., search field 602 (FIG. 6)).

At step 1104, the media guidance application generates for display (e.g., on display 312 (FIG. 3)) a cluster of media items in an interactive dial. For example, the media guidance application may generate for display cluster 606 (FIG. 6). The cluster may include criteria for media items based on the received alphanumeric characters. For example, if the media guidance application receives a search term of "Horror," the media guidance application may populate a cluster with media content related to the word "Horror" (e.g., media content of the Horror genre). The media guidance application may also allow a user to scroll and/or navigate through the various media items using an interactive dial or other navigation controls (e.g., arrow keys).

At step 1106, the media guidance application determines (e.g., via control circuitry 304 (FIG. 3)) whether an additional alphanumeric character was received. For example, the media guidance application may update and/or modify the generated cluster and/or media items in the cluster in response to the receipt of an alphanumeric character. Accordingly, the media guidance application may determine whether or not the alphanumeric character used upon which the cluster criteria is based is the most up-to-date. If an additional alphanumeric character was received, the media guidance application proceeds to step 1108. If an additional alphanumeric character was not received, the media guidance application proceeds to step 1110.

At step 1108, the media guidance application updates the cluster of media items in the interactive dial based on additional characters before returning to step 1106. For example, the media guidance application may cross-reference a database (e.g., located at storage 308 (FIG. 3) and/or any location accessible via communications network 414 (FIG. 4)) listing available media items with the combination of the alphanumeric character and any previously received alphanumeric characters to determine media items corresponding to the combination. For example, the media guidance application may input (e.g., via control circuitry 304 (FIG. 3)) the combination into the database, and the database may output media items corresponding to the combination.

At step 1110, the media guidance application determines whether a selection of a media item was received. For example, in addition to receiving alphanumeric characters, the media guidance application may receive (e.g., via user input interface 310 (FIG. 3)) a selection of a media item. The selection of the media item may modify the criteria of one or more clusters. If a selection of a media item was received, the media guidance application returns to step 1104. If a selection of a media item was not received, the media guidance application proceeds to step 1112.

At step 1112, the media guidance application updates (e.g., via control circuitry 304 (FIG. 4)) the cluster of media items in the interactive dial based on selection before returning to step 1106. For example, as discussed in relation to FIG. 6, the media guidance application may determine criteria for one or more clusters based on both the receipt of alphanumeric characters and user selections of media items in clusters that are generated for display. In some embodiments, the media guidance application may generate a cluster representing a category of media content, and each media item in the cluster may represent a sub-category of the media content. It should be noted that clusters and media items may or may not have a hierarchical structure and that embodiments discussed herein may have numerous types of structures.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 11.

Figure 12:
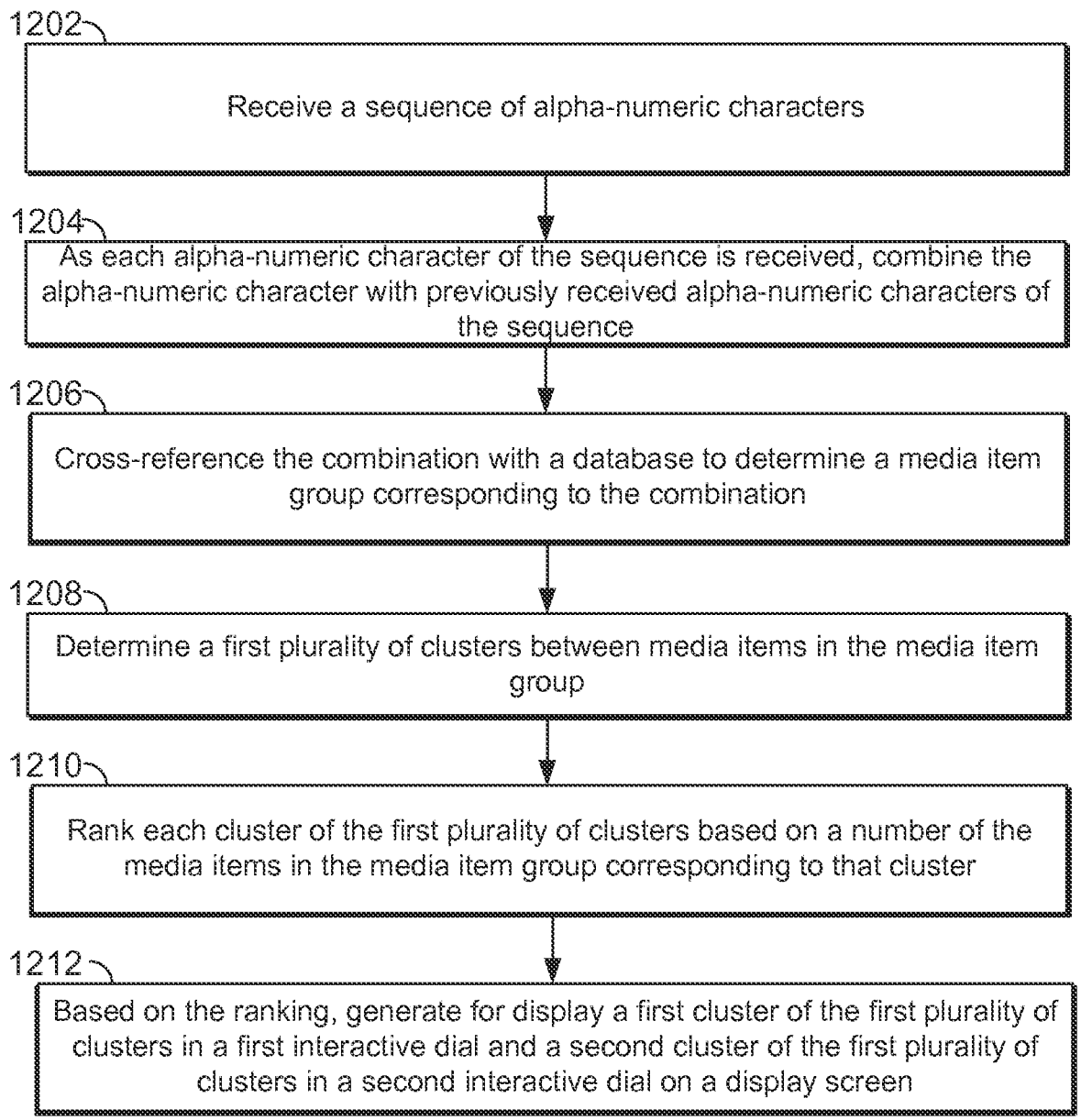
FIG. 12 is a flowchart of illustrative steps for generating for display clusters based on a ranking in accordance with some embodiments of the disclosure.

FIG. 12 is a flowchart of illustrative steps for generating for display clusters based on a ranking in accordance with some embodiments of the disclosure. It should be noted that process 1200 or any step thereof could be performed on, or provided by, any of the devices shown in FIGS. 3-4. For example, process 1200 may be executed by control circuitry 304 (FIG. 3) as instructed by a media guidance application implemented on user equipment 402, 404, and/or 406 (FIG. 4) in order to generate for display clusters based on a ranking. In addition, one or more steps of process 1200 may be incorporated into or combined with one or more steps of any other process or embodiment.

At step 1202, the media guidance application receives a sequence of alphanumeric characters. For example, the media guidance application may receive one or more user inputs (e.g., via user input interface 310 (FIG. 3)) representing a letter, number, and/or symbols that correspond to media content that the user wishes to receive. For example, the media guidance application may receive one or more user inputs populating a search field (e.g., search field 602 (FIG. 6)).

At step 1204, as each alphanumeric character of the sequence is received (e.g., via user input interface 310 (FIG. 3)), the media guidance application combines the alphanumeric character with previously received alphanumeric characters of the sequence. For example, the media guidance application may update any displayed clusters and/or media items in the clusters as additional alphanumeric characters are received.

At step 1206, the media guidance application cross-references (e.g., via control circuitry 304 (FIG. 3)) the combination with a database to determine a media item group corresponding to the combination. For example, the media guidance application may cross-reference a database (e.g., located at storage 308 (FIG. 3) and/or any location accessible via communications network 414 (FIG. 4)) listing available media items with the combination of the alphanumeric character and any previously received alphanumeric characters to determine media items corresponding to the combination. For example, the media guidance application may input (e.g., via control circuitry 304 (FIG. 3)) the combination into the database, and the database may output media items corresponding to the combination.

At step 1208, the media guidance application determines a first plurality of clusters between media items in the media item group. For example, the media guidance application may determine one or more clusters into which each media item corresponding to the combination falls. For example, the media guidance application may determine the group of media items that corresponds to the combination and divide the media items into overlapping or non-overlapping categories.

At step 1210, the media guidance application ranks (e.g., via control circuitry 304 (FIG. 3)) each cluster of the first plurality of clusters based on a number of the media items in the media item group corresponding to that cluster. For example, the media guidance application may rank clusters based on the number of media items in a cluster. In such cases, the largest cluster of the plurality of clusters may be the highest ranked. In another example, the media guidance application may rank clusters based on the frequency at which a media item in that cluster is selected. In such cases, a cluster containing media items that are most frequently selected may be ranked higher.

At step 1212, the media guidance application generates for display (e.g., on display 312) a first cluster (e.g., cluster 604 (FIG. 6)) of the first plurality of clusters in a first interactive dial and a second cluster (e.g., cluster 606 (FIG. 6)) of the first plurality of clusters in a second interactive dial on a display screen based on the ranking.

In some embodiments, the media guidance application may rank each cluster of the plurality of clusters based on a number of the media items in the media item group corresponding to that cluster. For example, a first cluster (e.g., corresponding to media items featuring the search term in the title) that includes five media items may be ranked lower than a second cluster (e.g., corresponding to media items featuring the search term in the cast and/or crew) that includes ten media items. Based on the ranking, the media guidance application may generate for display the first cluster of the plurality of clusters in the first interactive dial and a second cluster of the plurality of clusters in a second interactive dial on a display screen. For example, the media guidance application may generate for display the higher ranked cluster in an interactive dial that is more prominently located, sized, and/or graphically accentuated.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 12.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving a query on an electronic device;
   retrieving, in response to the query, a plurality of results, wherein the results are to be presented in a first cluster and a second cluster, wherein each item in the first and second clusters comprises a result of the query;
   determining a device characteristic of the electronic device;
   determining a number of results to be presented in each of the first cluster and the second cluster based on the device characteristic of the electronic device;
   dividing the plurality of results into overlapping and non-overlapping categories;
   generating for simultaneous display the first cluster and the second cluster containing the determined number of results of the plurality of results, wherein the first cluster includes a first portion of one of the overlapping and non-overlapping categories, wherein the second cluster includes a second portion of the one of the overlapping and non-overlapping categories, and wherein the simultaneous display includes displaying the first and second cluster on respective interactive dials that are ranked by the number of results corresponding to that cluster;
   receiving an input comprising additional information in the query or a selection of a result of the plurality of results from one of the first cluster and the second cluster; and
   in response to receiving the input, updating the first cluster and the second cluster.

2. The method of claim 1, further comprising determining a size of the cluster based on the determined device characteristic of the electronic device.

3. The method of claim 2, further comprising:
determining a change of the device characteristic of the electronic device; and
in response to determining the change of the device characteristic of the electronic device, modifying dimensions of the cluster based on the determined device characteristic of the electronic device.

4. The method of claim 1, further comprising:
determining a change of the device characteristic of the electronic device; and
in response to determining the change of the device characteristic of the electronic device, modifying the number of results presented in the cluster displayed on the electronic device, wherein the number of results is modified for optimized navigation in the cluster.

5. The method of claim 4, wherein modifying the number of results comprises one of removing at least one result from the cluster and adding at least one result from the cluster.

6. The method of claim 1, further comprising generating for display a graphic associated with a result of the one or more results.

7. The method of claim 1, further comprising determining a location of the cluster on a display screen based on the determined device characteristic of the electronic device.

8. The method of claim 7, further comprising graphically accentuating the cluster as compared to a second cluster in response to determining that the cluster corresponds to a higher number of results than the second cluster.

9. The method of claim 7, wherein the location of the cluster is at a position that is more prominent than a location of a second cluster on the display screen.

10. The method of claim 1, wherein the device characteristic of the electronic device comprises a size of the display screen of the electronic device.

11. The method of claim 1, wherein ranking by the number of results corresponding to that cluster relates to ranking by a number of media items in in that cluster relating to a media item group.

12. A system comprising:
control circuitry configured to:
receive a query on an electronic device;
retrieve, in response to the query, a plurality of results, wherein the results are to be presented in a first cluster and a second cluster, wherein each item in the first and second clusters is a result of the query;
determine a device characteristic of the electronic device;
determine a number of results to be presented in the first cluster and the second cluster based on the device characteristic of the electronic device;
divide the plurality of results into overlapping and non-overlapping categories;
generate for simultaneous display the first cluster and the second cluster containing the determined number of results of the plurality of results, wherein the first cluster includes a first portion of one of the overlapping and non-overlapping categories, wherein the second cluster includes a second portion of the one of the overlapping and non-overlapping categories, and wherein the simultaneous display includes displaying the first and second cluster on respective interactive dials that are ranked by the number of results corresponding to that cluster;
receive an input comprising additional information in the query or a selection of a result of the plurality of results from one of the first cluster and the second cluster; and
in response to receiving the input, update the first cluster and the second cluster.

13. The system of claim 12, wherein the control circuitry is further configured to determine a size of the cluster based on the determined device characteristic of the electronic device.

14. The system of claim 13, wherein the control circuitry is further configured to:
determine a change of the device characteristic of the electronic device; and
in response to determining the change of the device characteristic of the electronic device, modify dimensions of the cluster based on the determined device characteristic of the electronic device.

15. The system of claim 12, wherein the control circuitry is further configured to:
determine a change of the device characteristic of the electronic device; and
in response to determining the change of the device characteristic of the electronic device, modify the number of results presented in the cluster displayed on the electronic device, wherein the number of results is modified for optimized navigation in the cluster.

16. The system of claim 15, wherein modifying the number of results comprises one of removing at least one result from the cluster and adding at least one result from the cluster.

17. The system of claim 12, wherein the control circuitry is further configured to generate for display a graphic associated with a result of the one or more results.

18. The system of claim 12, wherein the control circuitry is further configured to determine a location of the cluster on a display screen based on the determined characteristic of the electronic device.

19. The system of claim 18, wherein the control circuitry is further configured to graphically accentuate the cluster as compared to a second cluster in response to determining that the cluster corresponds to a higher number of results than the second cluster.

20. The system of claim 12, wherein the device characteristic of the electronic device comprises a size of the display screen of the electronic device.

* * * * *

UNITED STATES PATENT AND TRADEMARK OFFICE
CERTIFICATE OF CORRECTION

| | | |
|---|---|---|
| PATENT NO. | : 12,235,854 B2 | Page 1 of 1 |
| APPLICATION NO. | : 17/363813 | |
| DATED | : February 25, 2025 | |
| INVENTOR(S) | : Patel | |

It is certified that error appears in the above-identified patent and that said Letters Patent is hereby corrected as shown below:

In the Claims

In Claim 18, Column 32, Line 47, please delete "determined characteristic" and insert --determined device characteristic--.

Signed and Sealed this
Fifteenth Day of July, 2025

Coke Morgan Stewart
*Acting Director of the United States Patent and Trademark Office*